United States Patent [19]

Fournier et al.

[11] Patent Number: 4,881,569
[45] Date of Patent: Nov. 21, 1989

[54] SELF-ALIGNING COUPLING

[75] Inventors: Paul J. E. Fournier, Jackson; Ernest F. Kulikowski, Marshall; Alan R. Allread, Jackson, all of Mich.

[73] Assignee: Aeroquip Corporation, Jackson, Mich.

[21] Appl. No.: 268,368

[22] Filed: Nov. 7, 1988

[51] Int. Cl.⁴ .......................... F16L 5/00; F16L 37/28
[52] U.S. Cl. ................... 137/360; 251/149.6; 119/18.72.5
[58] Field of Search ............. 251/149.6; 137/360; 119/18, 72.5, 75

[56] References Cited
U.S. PATENT DOCUMENTS 2,744,770  5/1956  Davidson et al. ............. 251/149.6
3,228,377  1/1966  Grassano ...................... 119/72.5
3,410,249 11/1968  Allen et al. .................... 119/72.5
4,576,359  3/1986  Oetiker ......................... 251/149.6

Primary Examiner—A. Michael Chambers
Attorney, Agent, or Firm—Beaman & Beaman

[57] ABSTRACT

The invention relates to a self-aligning coupling for connecting laboratory animal cages to a drinking water supply. A male coupling is attached to a grommet assembly at the back of the cage and a female coupling is assembled to a fluid supply manifold at the back of a shelf located so that when the cage is placed on the shelf and translated to the rear the male coupling will automatically connect to the female coupling and water supply. The grommet assembly allows the male coupling to be self-aligning in angular and radial directions to facilitate coupling.

8 Claims, 2 Drawing Sheets

SELF-ALIGNING COUPLING

BACKGROUND OF THE INVENTION

Couplings generally have releasable connection means that require applying a force directly to the coupling parts. One of the parts may be attached to a nonmoveable member and the other part is attached to a flexible hose, or, both parts may be attached to flexible hose, and direct handling of the parts is necessary when connecting them together.

Laboratory research has developed a need for a coupling that can be used for automatically connecting animal cages to a water supply without manipulation of the coupling parts. This requires one part to be attached to the water supply and the other part to the cage, and previously, a coupling not having at least one part attached to a hose and having releasable connection means without directly handling the parts has not been available.

It is an object of the invention to provide a coupling having one part attached to an animal cage and the other part attached to a water supply wherein the parts are automatically connected nd disconnected by linear displacement of the cage.

Another object of the invention is to provide a coupling where one of the parts has the capability to move in angular and radial directions for self-aligning with the other coupling part during connection.

A further object of the invention is to mount the coupling part associated with the cage to a support member that is recessed inside the cage so that the coupling part does not extend past the outside configuration of the cage allowing the cages to be stacked in a nesting manner for storage.

It is also an object of the invention to provide a laboratory cage self-aligning water supply coupling which will transmit air into the cage for ventilation purposes.

In the practice of the invention the male part is attached to a support member recessed in the back of a shelf supported laboratory cage and is capable of moving in limited angular and radial directions. The female part is assembled to a water supply manifold at the back of a shelf and located so that when the cage is displaced to the rear, the male part will automatically connect to the female part and water supply.

In the event that the male and female parts are misaligned when coupling, a counterbore on the female part will accept the misaligned male part and the capability of the male part to move in angular and radial directions will allow the parts to self-align.

During coupling a spring biased self-sealing valve in the female part engages the male part and is displaced to the open position when fully coupled, placing the axial passages in the male and female parts in fluid communication. When pulling the cage away from the female coupling part the valve in the female part will automatically close sealing the axial passage.

BRIEF DESCRIPTION OF THE DRAWINGS

The aforementioned objects and advantages of the invention will be appreciated from the following drawings wherein.

DESCRIPTION OF THE PREFERRED EMBODIMENT

Figure 1:
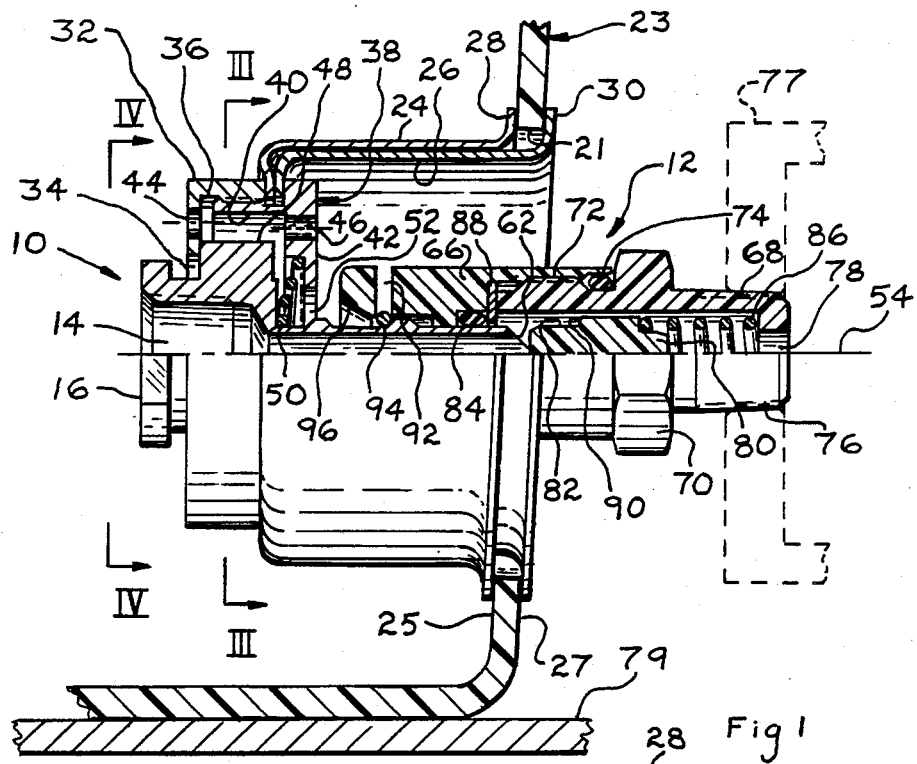
FIG. 1 is an elevational view, partially in diametrical section, of a self-aligning coupling in accord with the invention.
Figure 2:
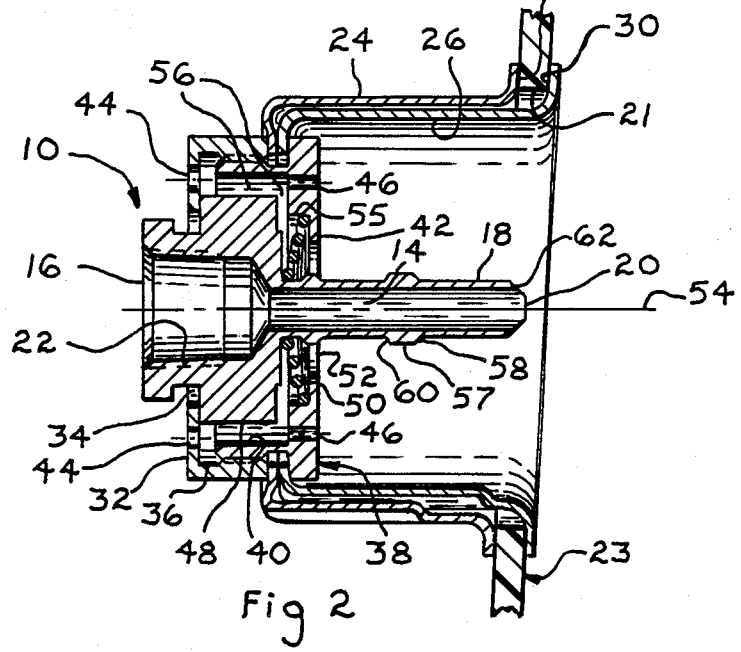
FIG. 2 is an elevational, sectional view of the male coupling part, per se, attached to an adjustable support member.
Figure 3:
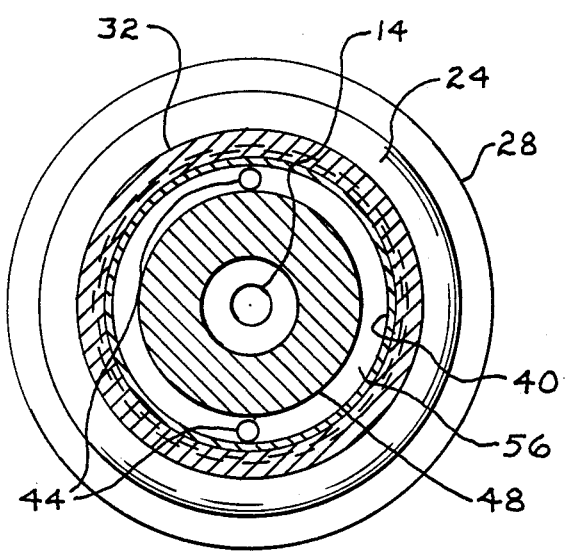
FIG. 3 is an elevational, sectional view, taken along Section III—III of FIG. 1.
Figure 4:
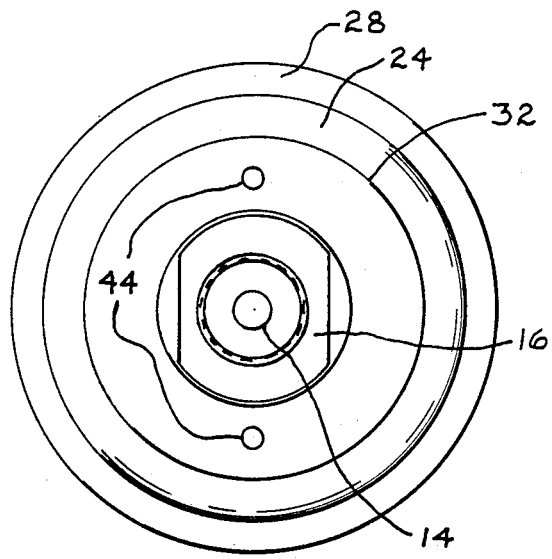
FIG. 4 is an elevational, end view, taken along Section IV—IV of FIG. 1.

In the embodiment of the invention disclosed in FIGS. 1-4, 10 indicates the male coupling body part and 12 the female coupling body part, each part having an axial passage and releasable connection means for automatically coupling and placing the axial passages in fluid communication.

The male part 10 has an axial passage 14, an inner end 16, a probe 18 having a free end 20, and is internally threaded at 22 adjacent the inner end 16 for connecting to a conventional animal dispensing device, not shown. The male part 10 is supported by a grommet assembly within an opening 21 defined in the wall 23 of a laboratory cage and includes, a female grommet 24 and a male grommet 26 each having a cup configuration. The cage wall 23 includes an inner side 25 and an outer side 27 and is oblique to the vertical to permit the stacking of empty cages, as is known. The female grommet 24 is recessed inside the cage and has a lip 28 engaging the inside surface 25 of the cage. The male grommet 26 engages the outside surface 27 of the cage with the lip 30 and extends through the cage opening 21 and resides within the female grommet 24. A threaded nut 32, having a cylindrical configuration with a hole 34 and a deep counterbore 36, engages the female grommet 24 and a retainer 38, having a hollow cylindrical threaded neck 40 with a flat circular head 42 is inserted through the grommets 24 and 26 where the nut 32 threads upo the protruding neck 40 and the retainer head 42 engages the male grommet 26. Spanner wrench holes 44 and 46 on the nut 32 and retainer 38 respectively are provided for a spanner wrench, not shown, to tighten the retainer 38 to the nut 32 compressing the grommets 24 and 26 to the cage. The spanner wrench holes 44 and 46 also allow fresh pressurized air into the cage.

The male part 10 has an annular shoulder 48 supported between the nut 32 and the retainer 38 by a conical compression spring 50 where the inner end 16 extends through the nut hole 34 to the inside of the cage and the male probe 18 extends through a hole 52 in the retainer head 42 and aligns with the axis 54 within the recess of the grommets 24 and 26. The outside diameter of the conical spring 50 is held concentric to the grommet assembly by the counterbore 55 in the retainer head 42. A cavity 56 between the nut 32 and the retainer 38 provides clearance for male annular shoulder 48 and allows movement of the male coupling 10 in angular and radial directions due to the mounting of the male part 10 by the spring 50. An annular shoulder 57 on the male probe 18 has oblique edges 58 and 60 for releasable locking engagement with the female part 12 as later described. The probe free end 20 has a pair of oblique edges 62 for initially opening the female part retainer.

The female part 12 consist of two main parts, a body 66 and an adaptor 68. The adaptor 68 includes wrench engaging flats 70 and has external threads located at 72 for mating with the body 66. A sealing O ring 74 seals the connection between the body 66 and the adaptor 68. The other end of the adaptor 68 has male threads located at 76 for connecting the female coupling part 12 to a water supply manifold 77 at the back of a cage supporting shelf 79. The female coupling part 12 is located so that when the cage is placed on the shelf 79 and displaced to the rear, the male coupling part 10 will automatically connect to the female coupling and water supply. The female coupling part 12 has an axial passage 78, wherein a valve assembly is located comprising a spring biased valve 80, that is manufactured from square stock where the corners have been turned to a suitable diameter for a slip fit into the axial passage 78. The valve 80 also has a nose 82 turned to provide a sealing surface for the seal ring 84 located on the interior surface of the female part 12. The valve closed position by a spring 86 where the nose 82 engages the seal 84 sealing the axial passage 78. A retainer 88, adjacent the seal 84 held in place by the adaptor 68 engage the annular step 90 adjacent the nose 82 to limit movement of the valve 80 in the axial passage 78. The female part 12 has a grove 92 wherein a horseshoe shaped spring clip 94 is located for retaining engagement with the annular shoulder 57 of the male probe 18. A large conical counterbore 96 on the outer end of the female coupling part 12 receives and aligns the male probe 18 during coupling.

It will be understood that the axis 54 of the parts 10 and 12 will be vertically located at the same distance above the top surface of the cage supporting shelf 79.

To connect the coupling parts 10 and 12 together it is merely necessary to place the cage on the shelf 79 adjacent the female coupling part 12 so that when the cage is moved to the rear of the shelf 79 the counterbore 96 of the female coupling part 12 will receive the male probe 18 whereby the edges 62 and 58 on the probe 18 will contact and open the clip 94. The clip 94 will remain open as it passes over the shoulder 57 until the edge 60 on the annular shoulder 57 passes, in which case the clip 94 will close retaining the coupling parts 10 and 12 together. Simultaneously, the male probe end 20 engages and displaces the valve 80 of the female part 12 to the open position against action of the spring 86 placing the passages 14 and 78 in fluid communication. The oblique edges 62 on the male probe free end 20 allow the fluid to flow around the valve 80 into the male passage 14. communication. The oblique edges 62 on the male probe free end 20 allow the fluid to flow around the valve 80 into the male passage 14.

During coupling, if the male coupling part 10 is not axial aligned with the female coupling part 12 when the cage is displaced to the rear of the shelf 79 the counterbore 96 will receive the misaligned male probe 18 and the capability of the male part 10 to move in angular and radial directions will allow the male probe 18 to automatically self-align with the female part 12 for properly coupling parts 10 and 12 together.

To disconnect the coupled parts 10 and 12 the cage is merely pulled away from the rear of the shelf wherein the edge 60 will contact and open the clip 94 permitting separation of the parts 10 and 12 and the valve 80 will close automatically by the action of the spring 86 sealing the axial passage 78.

The spanner holes 44 and 46 will allow air to flow through the male part 10 and, if desired, a pressurized air atmosphere may be maintained adjacent the rear of the cages and air will be forced into the cages through holes 44 and 46.

Figure 5:
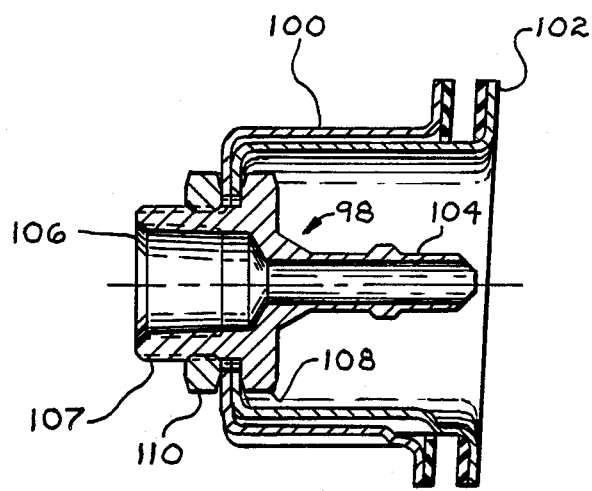
FIG. 5 is an elevational, diametrical sectional view of another embodiment of the invention wherein the male coupling is attached to a non-adjustable support member.

FIG. 5 discloses another embodiment of the invention which is not self-aligning where the male coupling part 98 is attached to a grommet assembly, comprising a female grommet 100 and a male grommet 102, that restricts the male part 98 from moving freely in any direction. The female grommet 100 and the male grommet 102 are of the same configuration as the grommets 24 and 26, respectively. The male part 98 has a probe 104 identical to the probe 18 of the male part 10, an inner end 106, and external threads 107 that are located adjacent the inner end 106. The male part 98 is assembled to the grommets 100 and 102 where an annular shoulder 108 on the male part 98 engages the male grommet 102 and the inner end 106 protrudes through the grommets 100 and 102 to the inside of the cage. A nut 110 mates with the external threads 107 and is tightened to compress the grommets 100 and 102 to the cage. The male part 98 is capable of coupling with the female part 12 in the same manner as the male part 10 couples with the female part 12 as long as both parts 98 and 12 are axially aligned.

It is appreciated that various modifications to the inventive concepts maybe apparent to those skilled in the art without departing from the spirit and scope of the invention.

We claim:

1. A coupling used to connect laboratory animal cages to a drinking water supply, comprising in combination, a female coupling part having an axial passage having an inner connection end and an open outer end and a spring biased valve located within the female axial passage axially moveable between open and closed positions, a male coupling part having an axial passage having an inner connection end and a probe having a free end to be received within said female outer end, first and second support members for supporting said male and female coupling parts, releasable connection means defined on said coupling parts for selectively coupling said parts placing said passages in fluid communication, said first support member attached to a fluid supply manifold, said second support member attached to the rear of a laboratory animal cage, each of said support members supporting an associated coupling part in a position whereby displacing said cage toward said first support member automatically couples said female and male parts coupling parts, said second support member comprising cup shaped male and female grommets, said cage having walls having inside and outside surfaces, said female grommet being received in said cage engaging said cage inside surface, said male grommet engaging said cage outside surface and protruding through said cage wall and received within said female grommet defining a recess, said male part having an annular shoulder engaging said male grommet and an inner end protruding through said grommets into said cage, a nut having mating means with said male inner end whereby tightening said nut compresses said grommets to said cage and supports said male probe within said female gromment recess.

2. A self-aligning coupling used to connect laboratory animal cages to a drinking water supply, comprising, in combination, a female coupling part having an axial passage having an inner connection end and an open outer end and a spring biased valve located within said female axial passage axially moveable between open and closed positions, a male coupling part having an axial passage having an inner connection end and an elongated probe having a free end to be received within said female part outer end, first and second support members for supporting said male and female coupling parts, respectively, releasable connection means defined on said coupling parts for coupling said parts together placing said passages in fluid communication, said first support member being attachable to a fluid supply manifold, said second support member being attachable to the rear of a laboratory animal cage, said coupling parts being connected by relative axial movement of said coupling parts, at least one of said support members having coupling part supporting means permitting movement of the associated coupling part in angular and radial directions during coupling for self-aligning of said coupling part during coupling.

3. In a self-aligning coupling as in claim 2, the laboratory cage having a rear wall having inside and outside surfaces, said second support member including male and a female grommets, said female grommet being recessed inside said cage wall engaging said inside surface, said male grommet engaging said cage wall outside surface and protruding through said cage wall and received in said female grommet defining a recess in said cage rear wall.

4. In a self-aligning coupling as in claim 3, a retainer having a hollow cylindrical neck and a flat circular head having a larger diameter than said neck, said retainer neck protruding through said male and female grommets whereby said head engages said male grommet, a cylindrical nut having a threaded hole receiving said retainer neck and engaging said female grommet, spanner wrench holes defined in said nut and said retainer head wherein a spanner wrench can be inserted to tighten said nut to said retainer compressing said grommets to said cage.

5. In a self-aligning coupling as in claim 2, said coupling part support means permitting self-aligning comprising lost motion means supporting said probe upon said first support member.

6. In a self-aligning coupling as in claim 4, a cavity between said nut and said retainer head, an annular shoulder defined on said male probe located in said cavity, a compression spring biasing said shoulder into engagement with said nut, said spring permitting said parts to be radially displaced with respect to said retainer and grommets.

7. In a self-aligning coupling as in claim 6, said cavity providing clearance for said male coupling annular shoulder allowing said male coupling part movement in radial and angular directions.

8. In a self-aligning coupling as in claim 4, said spanner wrench holes allowing air into the cage.

* * * * *